Feb. 3, 1948.    H. N. SUDDUTH    2,435,372
TIMING VALVE FOR TRACK SANDERS
Filed Jan. 26, 1945
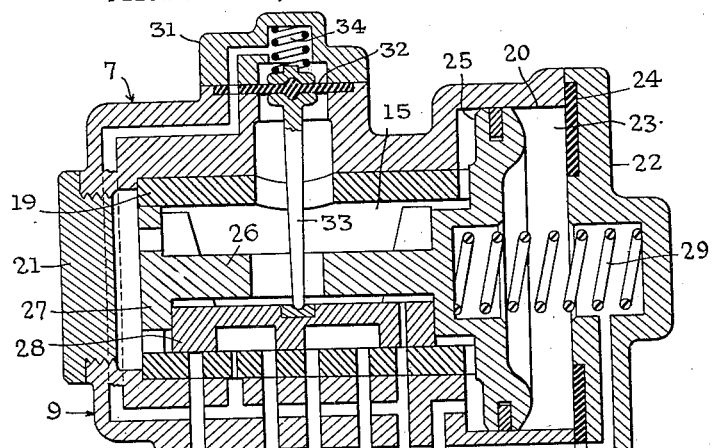
Fig. 1
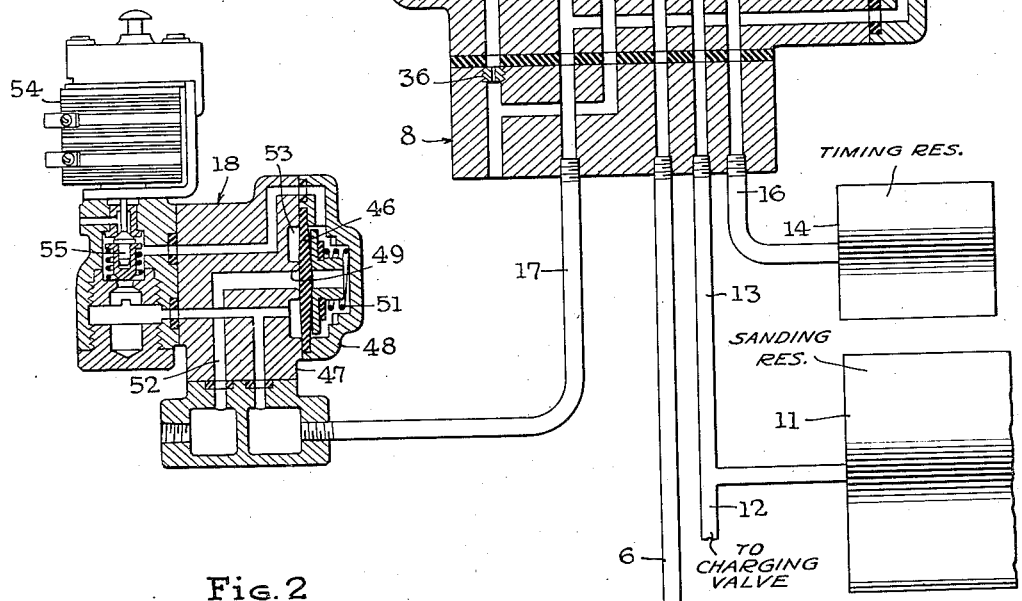
Fig. 2
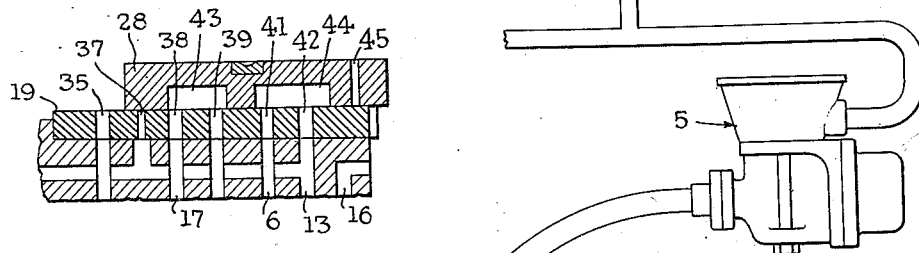
Inventor
Henry Norton Sudduth
By
Attorneys Patented Feb. 3, 1948

2,435,372

UNITED STATES PATENT OFFICE 2,435,372

TIMING VALVE FOR TRACK SANDERS

Henry Norton Sudduth, Watertown, N. Y., assignor to The New York Air Brake Company, a corporation of New Jersey Application January 26, 1945, Serial No. 574,719

2 Claims. (Cl. 291—3)

This invention relates to a timing valve for use in operating track sanders and like devices.

The invention provides a valve of this description which can be put into action by the momentary opening of a vent valve, will thereupon operate the sander for a definite period, and then reset.

A preferred embodiment of the invention is shown in the accompanying drawing, in which:

Fig. 1 is a view part in elevation, but chiefly in section, showing the essential sanding elements for one car, in their inactive or running positions.

Fig. 2 is a fragmentary section of the slide valve and seat of the timing valve, in sanding position.

In the drawing the porting of the timing valve and of the vent valve is diagrammed as if all the ports lay in a single plane. This permits all flows to be traced in a single view. More compact arrangements can readily be evolved and are commercially desirable.

To reduce the number of reference numerals and simplify description a single reference numeral is used to designate pipes and passages which form simple continuations of one another.

A sander of known form is indicated at 5. It is supplied with air for sanding through a connection 6. Any suitable number of sanders may be supplied by connection 6, which is shown with a branch for connecting one or more additional sanders (not shown).

Connection 6 leads to the timing valve generally indicated at 7 through a pipe bracket 8 on which the body 9 of the valve is removably mounted.

A sanding air reservoir 11 is charged through connection 12 by any suitable means, such as a charging valve connected with the air brake system. The reservoir 11 is in communication with the timing valve through connection 13.

A timing reservoir 14 serves to enlarge the volume of the slide valve chamber 15 in the body 9, with which it communicates by connection 16. The interchange of reservoirs of different size offers means for primary setting of the timing period.

The timing valve is connected by connection 17 with the electro-pneumatic vent valve generally indicated at 18.

The valve chamber 15 is formed by a valve seat bushing 19 pressed into body 9 and communicating at one end with a larger cylinder 20. A plug 21 closes one end of the slide valve chamber and a cap 22 closes the open end of the cylinder 20 so that a control chamber 23 is formed at the outer side of the piston 25. The cap is sealed to the body by a gasket 24, which also offers a sealing seat for the piston 25. Piston 25 works in the cylinder 20 and has a stem 26 guided in valve chamber 15 by spider 27. The piston has a packing ring, as shown, and the stem 26 has a notch in which the slide valve 28 is received so as to be reciprocated by the stem without substantial lost motion.

A coil compression spring 29 seated in sockets in piston 25 and cap 22 biases the piston inward. The depth of the sockets is such as to permit use of a spring of considerable length, so that the force resisting motion of the piston outward will not build up too rapidly. Inward motion of the piston is limited by collision with the end of bushing 19, which is notched as shown to permit air flow.

A cap 31 attached to the top of body 9 clamps the margin of diaphragm 32. A strut 33, connected to the center of the diaphragm reacts on the back (top) of slide valve 28. The strut is loaded by a coil compression spring 34 and also by the air pressure in reservoir 11 reacting on diaphragm 32 through a branch of passage 13. This prevents the valve from ever being blown from its seat.

The seat for slide valve 28 is formed in bushing 19 and has six ports. The related slide valve has two cavities and one through port, all of which are identified by numbers applied only to Fig. 2.

The ports in the seat are a timing port 35, which leads to atmosphere through an interchangeable choke 36; a restricted charging port 37 leading from passage 13; a controlling port 38 connected to passage 17 which also communicates with control chamber 23 at the outer side of piston 25; an exhaust port 39; a sander port 41 communicating with passage 6; and a reservoir port 42 fed by passage 13.

The interchange of different sized chokes 36 is the means usually availed of to change timing. If a long period requires the use of an undesirably small choke a larger reservoir 14 may be substituted.

The slide valve has cavities 43 and 44 and a restricted through port 45 arranged as shown, so that in running (non-sanding) position the timing port 35 is blanked; ports 37 and 38 are connected by cavity 43 to charge control chamber 23; ports 39 and 41 are connected by cavity 44 to vent the sanders and ports 42 and 45 register to charge valve chamber 15 and timing reservoir 14.

With the system charged, venting of connection 17 causes venting of control chamber 23. The air pressure in chamber 15 then forces the piston to the right overpowering spring 29. This shifts valve 28 to the position of Fig. 2 in which: port 35 is exposed and serves to bleed down the pressure in valve chamber 15; port 37 is blanked; port 38 is connected to exhaust port 39 by cavity 43 so that control chamber 23 is maintained vented causing piston 25 to remain in its outer position until pressure in chamber 15 is nearly completely dissipated; port 42 supplies air through cavity 44 to sander port 41 to operate the sander. Observe that all sanding air comes from reservoir 11, giving sustained action until the valve 28 is shifted back by spring 29, as it will be when the pressure in chamber 15 is dissipated.

While connection 17 may be controlled (i. e. vented and closed) by various means, the preferred mechanism is an electro-pneumatic valve such, for example, as that shown at 18 in Fig. 1, for which per se no novelty is here claimed.

The main valve element is a diaphragm 46 clamped at its periphery between body 47 and cap 48, and biased toward seat 49 by coil compression spring 51. The seat 49 controls an exhaust passage 52.

The annular space 53 on the inner side of diaphragm 46 is in free communication with passage 17 and when the diaphragm is forced to the right space 53 is connected to atmosphere.

A normally deenergized solenoid 54 operates a double beat poppet valve 55, so arranged that when the solenoid is deenergized, space 53 is connected with the space on the outer side of diaphragm 46. Since pressures acting on the diaphragm are equal spring 51 holds the diaphragm against seat 49. When, however, the solenoid is energized it shifts valve 55 so that it disconnects these spaces and connects the space on the outer side of the diaphragm to atmosphere. Pressure in space 53 unseats the diaphragm so that space 53 and passage 17 are vented.

Venting of passage 17 entails venting of control chamber 23, so that piston 25 moves to the right shifting slide valve 28 to the position of Fig. 2. In this position air is supplied to the sanders, but bleeding of chamber 15 and reservoir 14 commences and finally allows spring 29 to restore piston 25 and valve 28. By this time solenoid 54 will have been deenergized. The ports are so dimensioned and spaced that as the valve 28 moves to the left port 37 will recharge connection 17 and all communicating spaces, particularly the control chamber 23, somewhat in advance of the recharging of chamber 15 by port 45, and before final closure of the port 35. This ensures that the valve 28 will move full stroke and not stall in an intermediate position.

It should be observed that once piston 25 has shifted outward it is self-retaining until valve chamber 15 and reservoir 14 have been bled through choke 36. It is thus out of the control of the vent valve 18 during the timed sanding period. Consequently the precise time of resetting of valve 18 is not important. Even a second actuation of valve 18 while sanding is proceeding can have no disturbing effect.

Observe also, that any means which will cause piston 25 and valve 28 to shift to sanding position will initiate the sanding cycle, and that the piston will hold the valve in sanding position for the desired period. Hence various substitutes for valve 18 are possible.

Any means, manual, or automatic, may be used to control energization of solenoid 54 or its functional equivalent. Thus the mechanism is well adapted for association with brakes, wheel-slip detectors and similar devices heretofore proposed as means for controlling sanders.

What is claimed is:

1. The combination of a source of sanding air; an air operated sander; means forming a slide valve chamber; an expansible chamber motor having a movable abutment subject on one side to pressure in the valve chamber and on the other side to pressure in a control chamber; a ported slide valve coacting with a ported seat in the chamber and connected to be shifted by said abutment between an inward running position in which it vents the sander and charges both the valve chamber and the control chamber from said source, an outward sanding position in which it connects the sander with said source and affords a large capacity vent from the control chamber and a restricted vent from the valve chamber and an intermediate position in which it charges the control chamber without charging the valve chamber; means biasing the abutment and valve inward toward running position; and means for causing said abutment and valve to shift from running to sanding position.

2. The combination of a source of sanding air; an air operated sander; means forming a slide valve chamber; an expansible chamber motor having a movable abutment subject on one side to pressure in the valve chamber and on the other side to pressure in a control chamber; a ported slide valve coacting with a ported seat in the chamber and connected to be shifted by said abutment between an inward running position in which it vents the sander and charges both the valve chamber and the control chamber from said source, an outward position in which it connects the sander with said source and affords a large capacity vent from the control chamber and a restricted vent from the valve chamber and an intermediate position in which it charges the control chamber and vents the valve chamber at, at least, a restricted rate; means biasing the abutment and valve inward toward running position; and independent means for venting the control chamber at a rate which exceeds the charging rate thereof in running position.

HENRY NORTON SUDDUTH.

REFERENCES CITED

The following references are of record in the file of this patent:

UNITED STATES PATENTS

| Number | Name | Date |
|---|---|---|
| 2,291,874 | Campbell | Aug. 4, 1942 |